Patented Feb. 6, 1923.

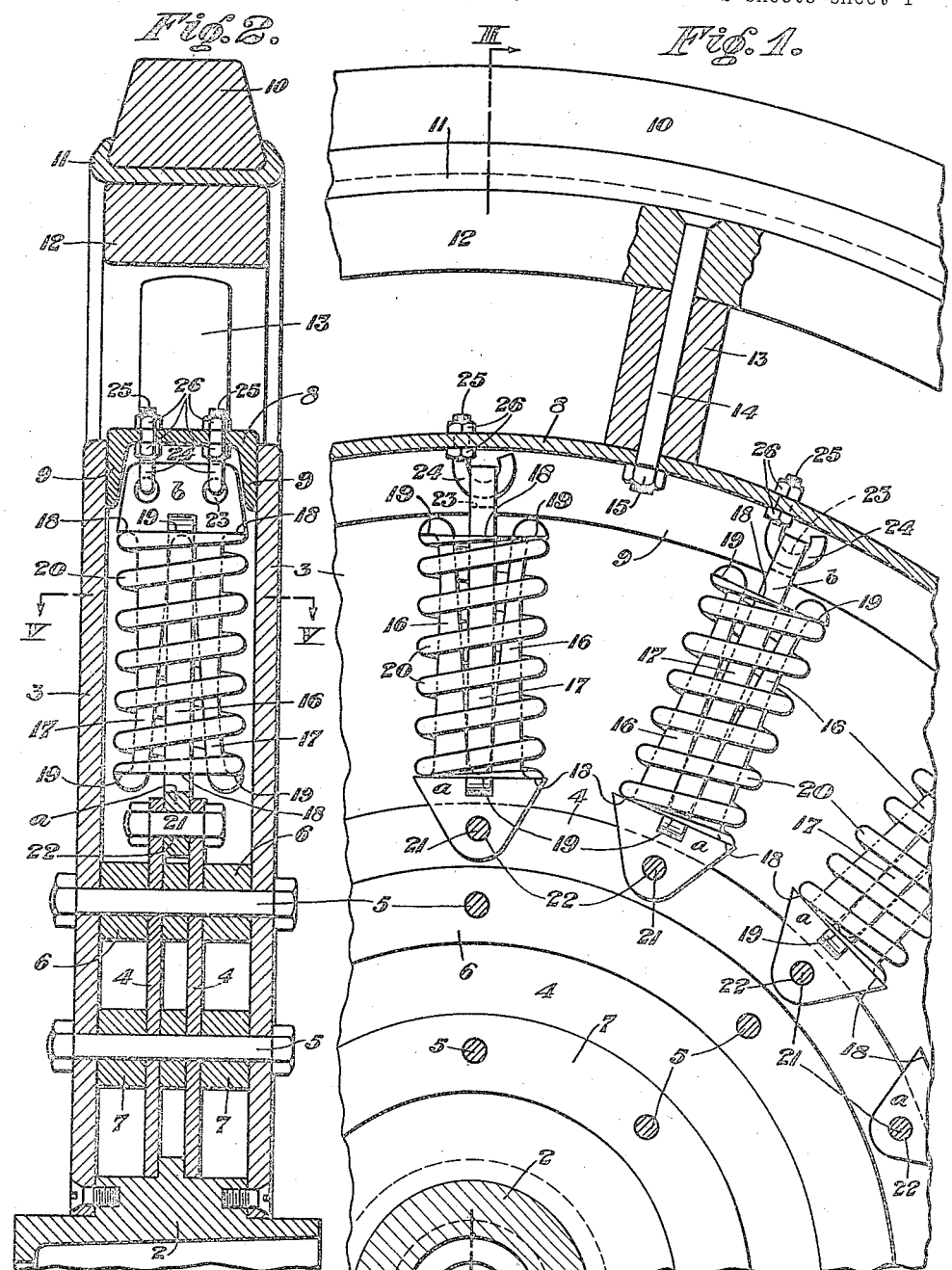

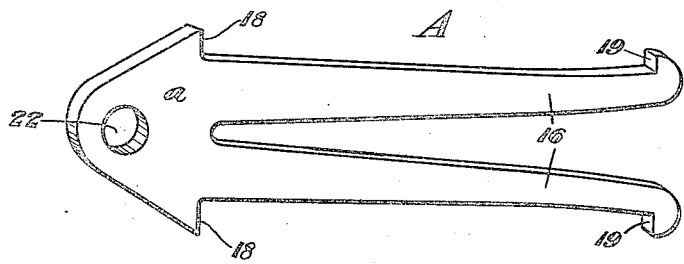
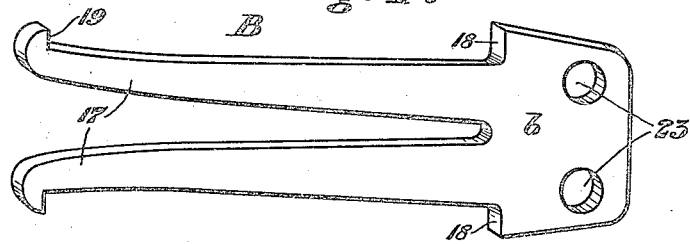
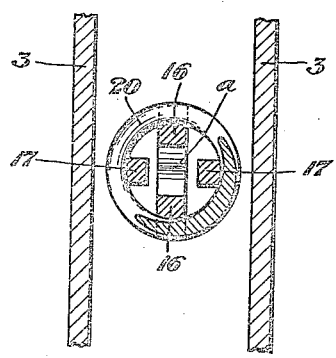
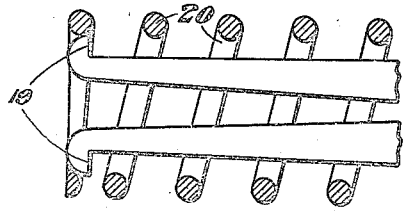

1,444,452

UNITED STATES PATENT OFFICE.

ELLSWORTH L. BIGELOW, OF PITTSBURGH, PENNSYLVANIA, ASSIGNOR OF ONE-HALF TO LEWIS O. BIGELOW, OF PITTSBURGH, PENNSYLVANIA.

WHEEL.

Application filed May 22, 1920. Serial No. 383,517.

*To all whom it may concern:*

Be it known that I, ELLSWORTH L. BIGELOW, a citizen of the United States, residing at Pittsburgh, in the county of Allegheny and State of Pennsylvania, have invented certain new and useful Improvements in Wheels, of which the following is a specification.

My invention relates to improvements in vehicle wheels, and more particularly wheels for trucks or heavy motor driven cars of the automobile type. It has for its object to provide a strong resilient wheel capable of supporting heavy loads and transmitting great driving power with ample provision for absorption of shocks, and incidentally enabling the use of a solid tire.

It comprises, generally stated, a central hub and fixedly attached circular plates, between which are mounted inner connecting or anchoring plates, an outer relatively movable channel rim, intervening cushion spring mechanism, and an outermost felloe, rim and tire constructed and adapted to operate in a manner more fully hereinafter described, In the drawings showing one preferred embodiment of the invention, Fig. 1 is a partial sectional view in side elevation of a portion of a wheel constructed according to my invention, certain outer circular plates near the hub of the wheel not being shown;

Fig. 2 is a vertical sectional view on the line II—II of Fig. 1 but showing the circular plates in position on the wheel;

Figs. 3 and 4 are detail views of parts of the interengaging members of one of the compound springs;

Fig. 5 is a cross sectional view on the line V—V of Fig. 2; and

Fig. 6 is a detail sectional view of a portion of the compound spring, showing its manner of connection.

In the drawings, the hub 2, of any suitable construction and adapted to be rotatably mounted upon the usual supporting axle, or to be driven thereby, is provided with outermost circular plates 3—3 which are fixedly secured to the hub 2 by bolts or in any other suitable manner, whereby to rigidly connect the hub and side plates. Inner plates 4—4 of smaller diameter than plate 3, are fixedly connected with plates 3 by bolts 5 which extend through all of the plates from one side to the other. One or more annular rings, 6—7 are also incorporated with plates 3 and 4 whereby to provide a substantial holding body outwardly from the hub for reception at the outer rim portions of plates 3 of an annular channel 8. The outer peripheral portions of plates 4 extend sufficiently beyond rings 6 for connection with the inner terminals of the several connecting spring members, and are spaced apart for such purposes by central spacing rings $6^a$, $7^a$. Channel 8, which may be of the usual commercial shape, is continuously circular and interfits by the outer faces of its flanges 9, between the outer peripheral portions of plates 3, between which channel 8 may be freely moved inwardly or outwardly under the stresses of traffic.

The tire 10, which may be of solid rubber or other suitable material, is mounted in the usual manner in a rim 11 carried upon the periphery of felloe 12 of usual construction. A series of connecting and supporting spokes 13, of any suitable number, intervene between rim 8 and felloe 12, and are fixedly held in position by central connecting bolts 14 which extend through the web of channel 8 and of felloe 12, and are provided with terminal nuts 15 whereby to tighten the parts together. As thus constructed, the tire 10 and its rim 11, felloe 12 and channel 8 are fixedly connected in annular relationship, so that they will operate together in traction and load supporting function, as a single annular unit.

For the purpose of providing the desired cushioning effect, I provide between such outer wall portion and the inner hub and plate members, a series of radially disposed spring members, each of which is adapted to absorb either compression or tension strains, depending upon their position in rotation of the wheel, and which will automatically operate together and adapt themselves to such varying conditions.

Each of said spring members comprises a hub connecting member A and a wheel connecting member B. Each of said members is provided with an outer attaching terminal $a$ and $b$ respectively, and a pair of inwardly extending spring engaging prongs or forks 16 and 17 respectively. Each attaching member $a$ and $b$ is provided with inner shoulders 18 and outer terminal abutments 19, between which is mounted the spiral spring 20. Fork members 16 are sufficiently resilient to admit of their compression together in the manner indicated in Fig. 6, for insertion between the coils of the spring 20, in assembling, so that when associated, as shown in Figs. 1 and 2, with prongs 16 and 17 arranged at right angles to each other, spring 20 will be embraced by said members and with sufficient compression between shoulders 18 and 19, so that the spring will be further compressed by longitudinal movement of members A and B either inwardly or outwardly.

Spring member A is fixedly connected to the peripheral portion of plates 4 at intervals, by connecting bolts 21 engaging the terminal bolt hole 22 of the inner head portion *a* of each member A. Spring member B is provided at its outer head portion *b* with a pair of similar holes 23, with which engage the hook terminals 24 of a connecting bolt 25 secured through the web of channel 8 by adjustable holding nuts 26.

As thus constructed, the several spring members, interposed between the fixed inner plates 4 and the outer relatively movable channel 8 of the main wheel, will transmit the load from the axle to the wheel, or will transmit torsional strains of traction, when used on the driving axle, with the intervening cushioning function, in an efficient and satisfactory manner.

As will be readily understood, the spring resistance may be easily varied by varying the number of the spring units, or the strength of each spiral spring. Also, one or several of the spring members may be entirely removed by removing one of the plates 3 and bolt 21 and hooks 24, so that the wheel may thus be easily adjusted to the load.

The construction of the invention is comparatively simple and inexpensive; the several parts are capable of easy substitution in case of breakage or wear; the spring members may be utilized in any desired number or with the necessary degree of tension dependent on the load and other conditions; and the device as a whole is well adapted to the objects in view.

It may be variously changed or modified in detail construction, design, proportions, or arrangement of the parts, by the skilled mechanic, but all such changes are to be considered as within the scope of the following claims.

What I claim is:

1. In combination, a hub member having a pair of fixedly attached circular plates, a channel member slidably mounted by its flanges between the plates at their rims and connected by its web with an outer tread portion, fixed anchoring elements between the plates and radially arranged pairs of spring holding prongs, each prong having shoulders near the opposite ends thereof, said prongs being connected to said anchoring elements and to the channel respectively and having associated cushioning means.

2. In combination, a hub member having a pair of fixedly attached circular plates, a channel member slidably mounted by its flanges between the plates at their rims and connected with an outer tread portion, centrally spaced fixed anchoring elements between the plates and a series of radially disposed sets of resilient connections, each consisting of an oppositely shouldered prong secured at one end between said anchoring elements, an oppositely shouldered prong secured at one end of the web of the channel member, and an embracing spring in operative relation to the prongs.

3. In combination, a hub member having a pair of fixedly attached circular plates, a channel member slidably mounted between the plates at their rims and connected with an outer tread portion, centrally spaced anchoring plates located between the circular plates, and a series of pairs of thin flat interfitting shouldered prong members, one of the members of each pair having its terminal connected at one end between the anchoring plates, the other member of each pair having one terminal connected to the channel member, the two members having shoulders thereon near the opposite ends thereof, and a spiral spring surrounding said members and confined between the shoulders thereof.

4. A resilient connection for the inner and outer parts of a wheel comprising a pair of bifurcated spring engaging members oppositely arranged with relation to each other, each member having an attaching terminal at its outer end, spring engaging shoulders formed thereon near the attaching terminals thereof, spring engaging shoulders on the prongs of each member, and a spring embracing the prongs and confined between the shoulders on the members.

5. A resilient connection for connecting the inner and outer parts of a wheel comprising a pair of spring engaging members bifurcated to provide prongs thereon, the two members being oppositely arranged, each member having means at its outer end for attachment to a part of the wheel, shoulders formed on each member intermediate the ends thereof for engaging a spring, lugs on the prongs of each member for engaging a spring, and a spiral spring surrounding the prongs and confined between the lugs and shoulders of the two members.

In testimony whereof I hereunto affix my signature.

ELLSWORTH L. BIGELOW.